(12) United States Patent
Guetta et al.

(10) Patent No.: US 8,989,884 B2
(45) Date of Patent: Mar. 24, 2015

(54) AUTOMATIC AUDIO CONFIGURATION BASED ON AN AUDIO OUTPUT DEVICE

(75) Inventors: Anthony J. Guetta, Redwood City, CA (US); Douglas S. Wyatt, Portola Valley, CA (US); Eric A. Allamanche, Sunnyvale, CA (US); William G. Stewart, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 13/116,895

(22) Filed: May 26, 2011

(65) Prior Publication Data

US 2012/0179279 A1 Jul. 12, 2012

Related U.S. Application Data

(60) Provisional application No. 61/431,806, filed on Jan. 11, 2011.

(51) Int. Cl.
 *G06F 17/00* (2006.01)
 *G11B 20/10* (2006.01)
 *G11B 20/00* (2006.01)

(52) U.S. Cl.
 CPC *G11B 20/10527* (2013.01); *G11B 2020/00028* (2013.01); *G11B 2020/00057* (2013.01); *G11B 2020/10555* (2013.01)
 USPC .......................................................... 700/94

(58) Field of Classification Search
 CPC ............................ G06F 17/00; H04N 21/4398
 USPC ............................................ 700/94; 386/232
 See application file for complete search history.

(56) References Cited

U.S. PATENT DOCUMENTS

| 6,389,473 B1 | 5/2002 | Carmel et al. |
| 6,574,471 B1 | 6/2003 | Rydbeck |
| 6,859,845 B2 | 2/2005 | Mate |
| 7,272,232 B1 | 9/2007 | Donaldson et al. |

(Continued)

FOREIGN PATENT DOCUMENTS

| EP | 2 302 633 | 3/2011 |
| JP | 2008 159167 | 7/2008 |

OTHER PUBLICATIONS

Anonymous, "HDMI Design and Initialization Sequence" retrieved on Apr. 17, 2012 from the Internet URL:http://www.cediacrosspoint.com/system/files/HDMIDesignandInitializationSequence dated Dec. 1, 2010 (12 pages).

(Continued)

*Primary Examiner* — Joseph Saunders, Jr.
(74) *Attorney, Agent, or Firm* — Blakely, Sokoloff, Taylor & Zafman LLP

(57) ABSTRACT

Techniques are provided for determining, at an audio processing device, whether to produce high quality or low quality audio output based on one or more factors. The one or more factors may include the type of output device (e.g., headphones, built-in speakers, or USB audio devices) that is connected to the audio processing device and whether certain operations (e.g., mixing and/or scaling) are to be performed on the decoded audio content. Thus, the highest quality audio output is produced based on current conditions of the audio system, which includes the output device. If the current conditions of the audio system indicate that producing high quality audio output does not yield sufficient perceived benefits, then the audio processing device may produce lower quality audio output.

26 Claims, 4 Drawing Sheets

(56) References Cited

U.S. PATENT DOCUMENTS

| | | |
|---|---|---|
| 7,561,932 B1 | 7/2009 | Holmes et al. |
| 7,653,203 B2 | 1/2010 | Holmi et al. |
| 7,756,277 B2 | 7/2010 | Andrews et al. |
| 7,861,008 B2 | 12/2010 | Batson et al. |
| 8,138,840 B2 * | 3/2012 | Ainspan et al. ............... 331/1 A |
| 2002/0006785 A1 | 1/2002 | Ohtsuki |
| 2002/0164155 A1 | 11/2002 | Mate |
| 2003/0215098 A1 | 11/2003 | Marumoto |
| 2004/0093099 A1 | 5/2004 | Brennan |
| 2005/0180578 A1 | 8/2005 | Cho et al. |
| 2006/0121886 A1 | 6/2006 | Maehara et al. |
| 2007/0019823 A1 | 1/2007 | Miyazaki et al. |
| 2007/0203979 A1 | 8/2007 | Walker et al. |
| 2007/0207733 A1 | 9/2007 | Wong et al. |
| 2007/0283423 A1 | 12/2007 | Bradley et al. |
| 2008/0144560 A1 | 6/2008 | Jia et al. |
| 2008/0183575 A1 | 7/2008 | Kaplan et al. |
| 2008/0186960 A1 | 8/2008 | Kocheisen et al. |
| 2008/0244050 A1 | 10/2008 | Wong et al. |
| 2008/0312761 A1 * | 12/2008 | Kasa et al. ..................... 700/94 |
| 2009/0003620 A1 | 1/2009 | McKillop et al. |
| 2009/0005891 A1 | 1/2009 | Batson et al. |
| 2009/0005892 A1 | 1/2009 | Guetta et al. |
| 2009/0006671 A1 | 1/2009 | Batson et al. |
| 2009/0034750 A1 | 2/2009 | Ayoub et al. |
| 2009/0060455 A1 | 3/2009 | Pan et al. |
| 2009/0187967 A1 | 7/2009 | Rostaing et al. |
| 2010/0271555 A1 | 10/2010 | Choi et al. |
| 2011/0093620 A1 | 4/2011 | Batson et al. |
| 2011/0213901 A1 | 9/2011 | Rostaing et al. |

OTHER PUBLICATIONS

"Notification of Transmittal of the International Search Report and the Written Opinion of the International Searching Authority, or the Declaration" received in International Application No. PCT/US12/20896 dated Apr. 25, 2012 (12 pages).

Current Claims of International Application No. PCT/US12/20896 dated Apr. 2012 (3 pages).

PCT International Preliminary Report on Patentability (Chapter I) for corresponding International Application No. PCT/US2012/020896, mailing date Jul. 25, 2013, 7 pages.

* cited by examiner

AUTOMATIC AUDIO CONFIGURATION BASED ON AN AUDIO OUTPUT DEVICE

RELATED CASE

This application is related to and claims the benefit of priority from provisional Patent Application No. 61/431,806 filed Jan. 11, 2011, entitled "AUTOMATIC AUDIO CONFIGURATION BASED ON AN AUDIO OUTPUT DEVICE"; the entire content of which is incorporated by this reference for all purposes as if fully disclosed herein.

This application is related to U.S. application Ser. No. 11/824,320, entitled, "Data-Driven Media Management Within An Electronic Device," filed Jun. 28, 2007, the entire contents of which is hereby incorporated by reference as if fully set forth herein for all purposes.

FIELD OF THE INVENTION

The present invention relates to audio processing and, more specifically, determining whether an audio processing device should produce high quality or low quality audio output depending on the current conditions associated with the audio processing device.

BACKGROUND

Computing devices can often handle playback of multiple types of media. The media that may be played back by computing devices often includes numerous forms/formats of video, and numerous forms/formats of audio. Within such computing devices, one or more applications may play back media. Non-limiting examples of types of applications that may attempt to play back media within a handheld computing device include a telephone application, a web browser, an e-mail application, multimedia message service (MMS), a music player, and video player.

One factor that determines the perceived quality of audio is bit depth. In digital audio, bit depth indicates the number of bits recorded for each audio sample. Bit depth directly corresponds to the resolution of each audio sample in a set of digital audio data. The larger the bit depth, the more bits are allocated for each audio sample and, thus, more information is available to produce audio with higher fidelity. Common examples of bit depth include CD quality audio, which is recorded at 16 bits, and DVD audio, which can support up to 24-bit audio. Thus, "16-bit audio" refers to a bit depth of 16, "24-bit audio" refers to a bit depth of 24, etc.

For some desktop or laptop computers, a user is able to, via an audio setup application, configure an output device by selecting 16-bit or 24-bit as the bit depth. However, smaller audio processing devices, such as handheld electronic devices (e.g., mobile phones and tablet devices), typically only produce 16-bit audio, regardless of the output device (e.g., integrated or built-in speakers, headphones, USB audio devices) that is connected to the handheld device. One reason for only producing 16-bit audio is that handheld devices are power-constrained devices and producing 24-bit audio requires additional processing relative to producing 16-bit audio. Many handheld devices include one or more fixed-point decoders (e.g., one decoder for each audio format, such as AAC). Each decoder (either hardware or software) includes simple multiply and add units, each of which operate on integer numbers and produce 16-bit audio. Thus, even though a USB audio device that is connected to a handheld device may be able to output an analog signal based on 24-bit audio, the handheld device to which the USB audio device is connected only produces 16-bit audio for the USB audio device.

Other handheld devices have greater power and more sophisticated circuitry that can operate on floating-point numbers instead of integer numbers and can produce floating-point audio samples. Thus, the same decoders that traditionally exist for laptop and desktop computer may be used for these handheld devices. If the source audio content was in 24-bit, then operating in the floating point domain allows the dynamic range of the source audio content to be maintained and a high fidelity 24-bit audio can be produced.

However, an audio processing device always producing 16-bit audio or always producing 24-bit audio may have some disadvantages, depending on the connected output device and other factors that correspond to the state of the audio processing device. For example, some output devices can produce noticeably better-sounding audio based on 24-bit audio rather than 16-bit audio. Thus, always decoding source audio content to 16-bit audio will not realize the benefits available when such output devices are connected to the audio processing device. As another example, some output devices do not produce noticeably better-sounding audio based on 24-bit audio compared to 16-bit audio. Thus, always decoding source audio content to 24-bit may not be worth the extra processing required to decode to and/or operate on 24-bit audio.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An audio processing device determines, from among a plurality of possible decode formats, a particular decode format to which source audio content is to be decoded. One or more factors are considered in making the determination of which decode format to select. One factor may include the format associated with output device (i.e., "hardware format") to which the audio output is destined. Examples of hardware formats includes 16-bit audio and 24-bit audio. However, embodiments of the invention are not limited to these particular bit depths. Other possible bit depths include, for example, 8, 32, and other bit depths that are not on a byte boundary (e.g., 20). Non-limiting examples of output devices include built-in speakers, headphones, and USB audio devices. Another factor in making the determination of which decode format to select may include whether certain operations are to be performed on the decoded audio before the decoded audio is converted to an analog signal.

In some situations, the perceived quality of high quality audio output (e.g., corresponding to 24-bit audio) may be the same as the perceived quality of lower quality audio output (e.g., corresponding to 16-bit audio) due to various factors. One such factor may be the limitations of the output device or the quality of the digital-to-analog converter (DAC) associated with the output device. Thus, the extra processing to produce high quality audio output may not be warranted, especially since producing low quality audio output will conserve resources (e.g., processing time and power consumption), of the audio processing device, that would otherwise be used to produce 24-bit audio. For example, analog audio output to headphones may have the same perceived quality regardless of whether the corresponding digital audio was in 16-bit or 24-bit format.

Example Handheld Device

The techniques described herein may be applied to any type of electronic device for which one or more applications play back media. For example, the electronic device may be an iOS™ device, such as an iPhone™, iPod Touch™, iPad™, or Apple TV™, or any other type of electronic device. Handheld electronic devices, such as personal digital assistants (PDAs) and mobile phones, are examples of electronic devices to which the techniques may be applied. For the purpose of explanation, examples of the techniques will be given with reference to handheld devices, but it should be noted that the techniques are not limited to such devices.

Figure 1:
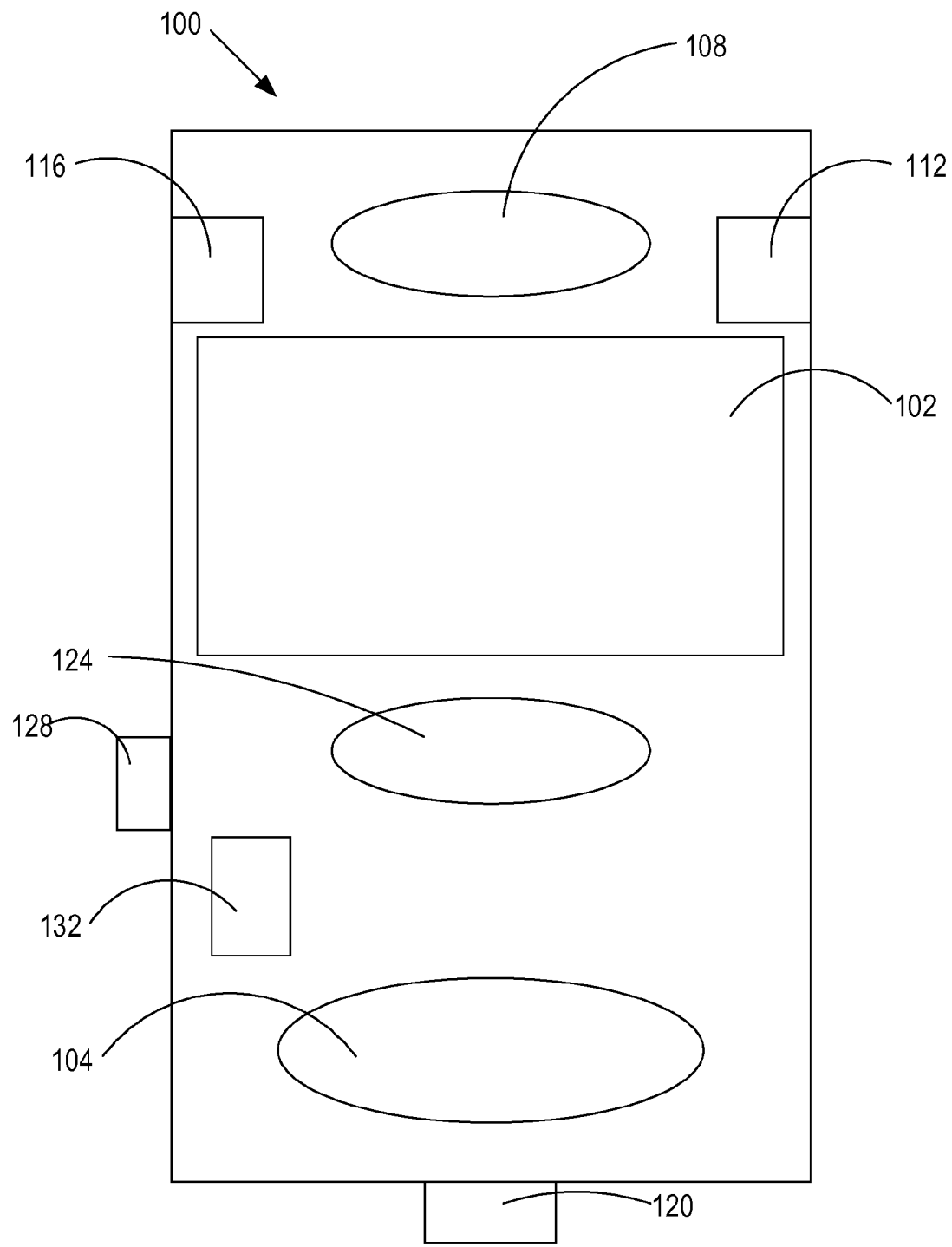
FIG. 1 is a block diagram that depicts components of a handheld device upon which an embodiment of the invention may be implemented.

FIG. 1 depicts an example handheld device 100 upon which an embodiment of the invention may be implemented. Handheld device 100 comprises at least a display 102 (which may or may not be touch-sensitive), a main speaker 104, a telephone receiver/speaker 108, a jack 112 for either headphones (listen only) or headset (listen and talk), a wireless transmitter/receiver 116 such as but not limited to Bluetooth®, a line out port 120 (suitable for a docking station used by, e.g., a larger home-audio system), and also a user interface (UI) speaker 124 (e.g. for keypad click-tones). Other types of speakers and audio ports may also be included.

The touch-sensitive version of display 102 may contain a keypad which in turn can generate sounds when touched.

Telephone receiver/speaker 108 may be similar to a receiver used within a conventional telephone.

Handheld device 100 further comprises a mute switch 128, and a vibration means 132. A mechanism for enabling/disabling the vibration means 132 may be available through display 102 by accessing a software application loaded on device 100.

Handheld device 100 may execute one or more software applications (not shown), non-limiting examples of which include applications for e-mail, telephone, voice-mail, web-browser, short messaging service (SMS), entertainment player either for music or video, camera functions, and slide-show presentation (with music accompaniment).

UI speaker 124 may be used for playing keypad sounds (e.g., clicks) and notifying a user (e.g., via alert sounds) that certain steps and key-actions may not be permitted.

Audio Processing Components

Figure 2:
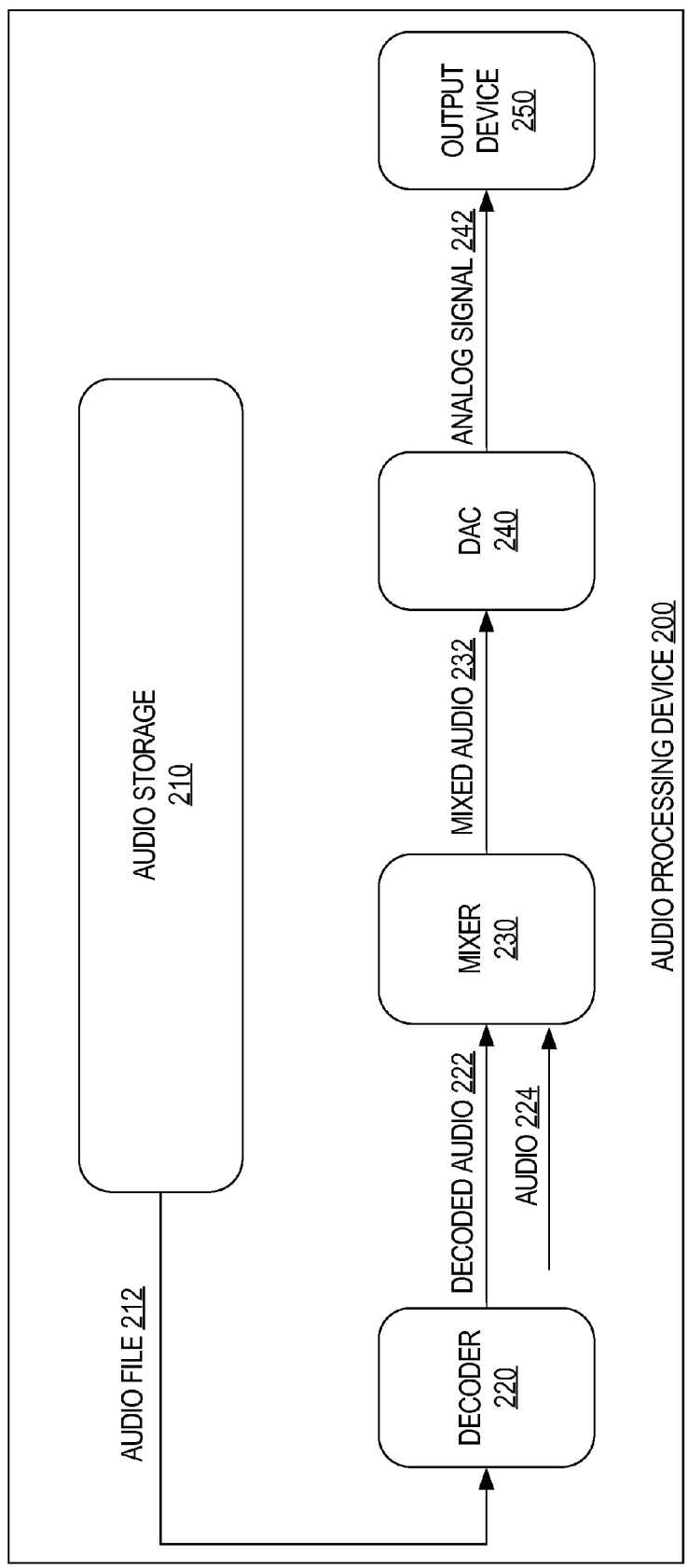
FIG. 2 is a block diagram that depicts additional components of device 100, according to an embodiment of the invention.

FIG. 2 is a block diagram that depicts audio processing components of an audio processing device 200, according to an embodiment of the invention. In an embodiment, audio processing device 200 is handheld device 100. In FIG. 2, audio processing device 200 includes an audio storage 210, a decoder 220, a mixer 230, a digital-to-analog converter (DAC) 240, and an output device 250. Each of decoder 220, mixer 230, and DAC 240 may be implemented in hardware, software, or any combination of hardware and software.

Audio storage 210 contains one or more audio files. Non-limiting example of audio files that are contained in audio storage 210 include music files, audio files corresponding to system-generated sounds, and multimedia files that include video data in addition to audio data. The audio data in the audio files contained in audio storage 210 may be encoded in different formats. Non-limiting examples of different formats include Advanced Audio Coding (AAC), MPEG-1 or MPEG-2 Audio Layer 3 (MP3), 16-bit pulse-code modulation (PCM), 24-bit PCM, Apple Lossless, Waveform Audio File Format (WAV), and Audio Interchange File Format (AIFF).

As depicted in FIG. 2, an audio file 212 is input to decoder 220. Decoder 220 decodes the encoded audio data of audio file 212 to generate decoded audio 222. Non-limiting examples of decode formats of decoded audio data at this stage include 32-bit floating point numbers, 8.24 fixed-point integers, 24-bit integers, and 16-bit integers. In an embodiment, 16-bit integers are considered low quality while 32-bit floating point numbers, 8.24 fixed-point integers, and 24-bit integers are considered high quality.

If audio processing device 200 supports the storage and playback of audio data encoded in multiple formats, then audio processing device 200 may include a decoder for each encoded format. For example, audio processing device 200 may include an AAC decoder and an MP3 decoder.

Decoded audio 222 is input to mixer 230 which combines multiple audio streams into a single audio stream. In the example depicted in FIG. 2, audio 224 is also input to mixer 230. An example of audio file 212 is a music file. While the audio data in audio file 212 is being decoded, an email may be received at audio processing device 200. The reception of the email may trigger the generation of a system sound, which is represented as audio 224 before the corresponding audio is played by output device 250. Audio 224 may be decoded audio data (and, thus, does not require decoder 220) or may be encoded audio data (e.g., from another music file) that first requires decoding by decoder 220 (or another decoder not shown).

Mixer 230 generates mixed audio 232 based on decoded audio 222 and audio 224. Audio 232 may be of the same format as decoded audio 222 described above, namely 32-bit floating point numbers, 8.24 fixed-point integer, and 16-bit integers. If multiple audio streams do not need to be mixed, then decoded audio 222 may be input to DAC 240 without passing through mixer 230.

Mixed audio 232 is input to DAC 240, which converts digital audio data into an analog signal that is transmitted to output device 250. Prior to being input to DAC 240, mixed audio 232 may need to be converted to a different format that DAC 240 may recognize. For example, if mixed audio 232 is based on 32-bit floating point numbers, then mixed audio 232 may be converted to a 24-bit format or a 16-bit format, depending on the hardware format associated with each output device 250. Non-limiting examples of hardware formats include a 16-bit format and a 24-bit format.

In FIG. 2, DAC 240 is a component of audio processing device 200. However, audio processing device 200 may include zero DACs or multiple DACs. If audio processing device 200 does not include any DACs, then any output devices connected to audio processing device 200 must have, or be connected to, a DAC.

In FIG. 2, output device 250 is a component of audio processing device 200. Thus, output device 250 may be built-in speakers, such as speaker 108 of handheld device 100. In a related embodiment, output device 250 is external to device 200. In that scenario, output device 250 may be, for example, headphones, USB audio devices, a High-Definition Multimedia Interface (HDMI) device, line out speakers, a stereo Bluetooth (i.e., A2DP) accessory, ad DisplayPort device, or an AirPlay receiver. The type and quality of audio output devices vary widely. As noted herein, some output devices are built into an audio processing device, such as a laptop computer or handheld device. Other output devices are external to the audio processing device. An external output device may be connected to an audio processing device via multiple types of ports, such as a USB port, a Firewire port, a serial port, a parallel port, an earphone jack, a wireless port (e.g., Bluetooth), etc.

FIG. 2 does not indicate all the possible operations that may be performed on digital audio data other than decoding and mixing. Thus, one or more operations may be performed on decoded audio 222 (i.e., before mixer 230 processes decoded audio 222) and/or on mixed audio 232 (i.e., after mixer 230 processes decoded audio 222). Non-limiting examples of such operations include scaling, equalization, time-pitch adjustment (e.g., speeding up or slowing down audio), sample rate conversion, and dynamic range compression. Equalization is the process of adjusting (e.g., boost or cut/attenuate) the strength of certain frequencies within a signal.

Determining a Decode Format

Figure 3:
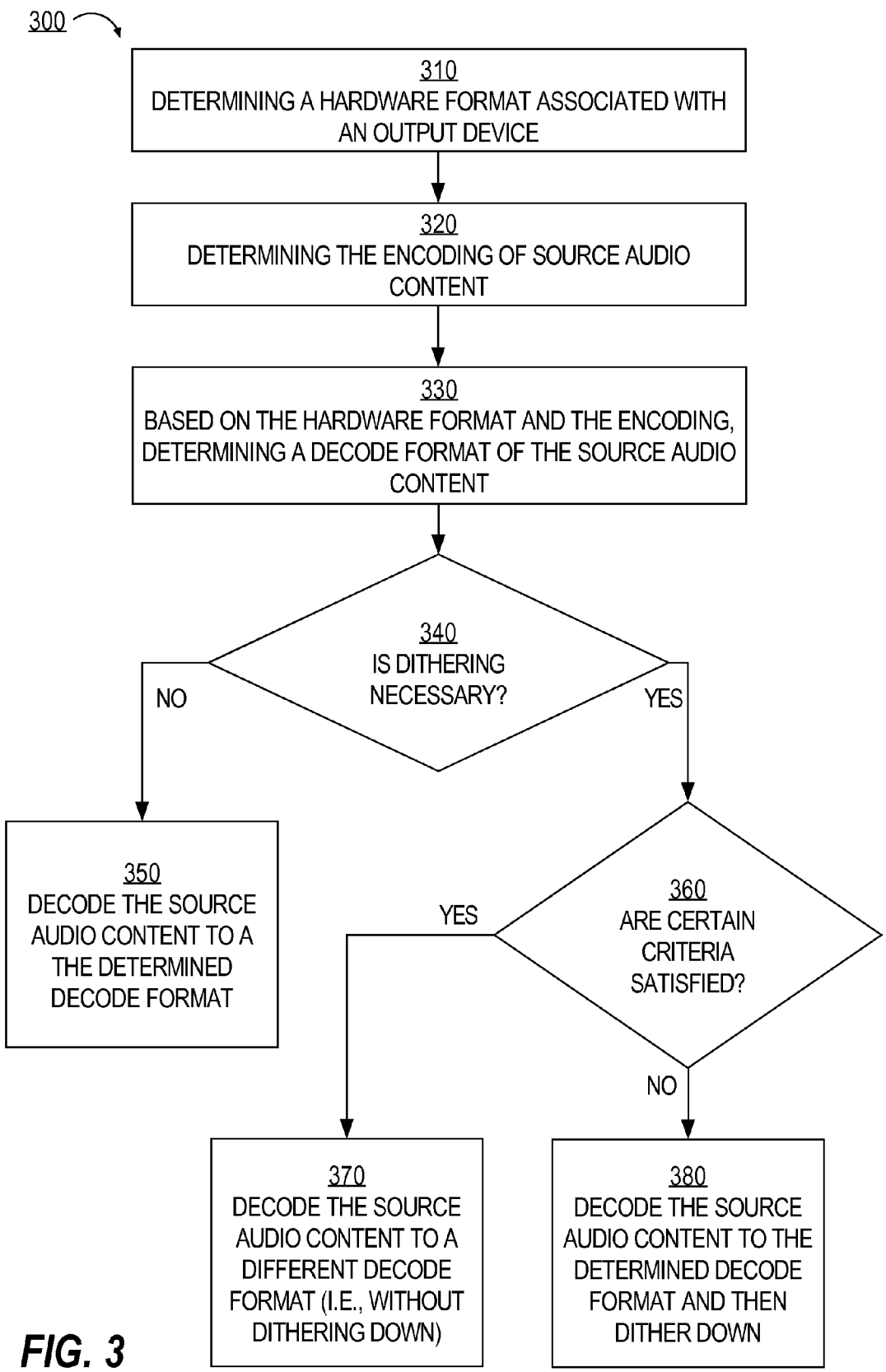
FIG. 3 is a flow diagram that depicts a process for determining a decode format for encoded audio content, according to an embodiment of the invention.

FIG. 3 is a flow diagram that depicts a process 300 for determining a decode format to which certain audio content is to be decoded, according to an embodiment of the invention. Process 300 may be implemented in hardware, software, or a combination of hardware and software. For example, process 300 may be hardware implemented using a device (e.g. a programmable logic array) having a plurality of elements, including logical elements, wherein the elements are programmed/configured to implement the method described herein. As an alternative, process 300 may be hardware implemented by way of another device such as an application specific integrated circuit (ASIC) having elements, including logical elements, that are constructed/configured to implement the method described herein. As a further alternative, process 300 may be software implemented such that the method described herein is set forth in a set of instructions that are stored in a machine readable storage medium and executed by one or more computing devices (such as the sample computer system depicted in FIG. 4) to carry out the method described herein. These and other implementations are possible. All possible implementations are within the scope of the present invention.

At step 310, an audio processing device (e.g., handheld device 100) determines the hardware format (e.g., 16-bit or 24-bit) associated with an output device. The hardware formats are dictated by the capabilities of the output device. One or more of the hardware formats may be communicated to the audio processing device, such as in the case of HDMI. Additionally or alternatively, one or more hardware formats are stored on the audio processing device based on prior knowledge of the supported hardware formats of a particular output device. For example, the DAC chip built into the audio processing device will support a particular set of hardware formats.

The association between hardware formats and output devices may be reflected in a plurality of mappings that are stored on the audio processing device. Each mapping maps a type of output device (or specified port) to a hardware format. Thus, one mapping may associate an HDMI device with a 24-bit hardware format (e.g., after the HDMI device communicates that hardware format to the audio processing device). Another mapping may associate a line out port with a 16-bit hardware format.

Certain output devices and/or ports may be considered high quality (HQ) or low quality (LQ) even though each output device requires a 16-bit hardware format. For example, a line out port and built-in speakers are considered LQ while USB audio devices, AirPlay receivers, and a DisplayPort port may be considered HQ. Thus, in an embodiment, an output device or port may be associated with data that indicates whether it is HQ or LQ. This association may be stored within, or separate from, the mappings described previously.

In an embodiment, even though an output device (e.g., headphones) is capable of processing 24-bit audio (or rather, the DAC associated with the output device is capable of processing 24-bit audio), the output device (e.g., via a mapping) may be associated with a different hardware format (16-bit). This may be due to the fact that the output device is not associated with a DAC of sufficient quality. It may be determined that the perceived quality of 16-bit audio played by the output device is the same as the perceived quality of 24-bit audio played by the same output device. Therefore, the benefits of not performing the extra processing required to generate 24-bit audio may outweigh any perceived increase in quality from the 24-bit audio.

At step 320, the audio processing device determines the encoding of the source audio content. This step may be optional if the audio processing device stores and processes audio data that is encoded in only a single format (e.g., AAC). However, if the audio processing device stores one set of audio data that is encoded in one format and another set of audio data that is encoded in another format, then the audio processing device determines the encoding format of the source audio content.

At step 330, the audio processing device determines, based on the hardware format and the encoding format, a processing mode decode format to which the audio content is to be decoded. Table 100 provides examples of different encoding formats, different hardware formats, and corresponding decode formats. Embodiments of the invention are not limited to the hardware formats, encoding formats, or decode formats listed in Table 100.

TABLE 100

| ENCODING FORMAT | LQ HW FORMAT | HQ HW FORMAT |
|---|---|---|
| 16-BIT PCM | 16-bit integer | 8.24 fixed-point integer (w/dithering) |

TABLE 100-continued

| ENCODING FORMAT | LQ HW FORMAT | HQ HW FORMAT |
|---|---|---|
| 24-BIT PCM | 16-bit integer | 32-bit floating point number |
| AAC | 16-bit integer | 32-bit floating point number |
| MP3 | 16-bit integer | 8.24 fixed-point integer (w/dithering) |

Thus, according to Table 100, the fidelity of the output device is a significant factor in determining the decode format to which source audio content is to be decoded.

For example, if the source audio content is encoded in the 16-bit PCM format and the output device is associated with a low quality hardware format (e.g., 16 bits), then the decode format is determined to be a 16-bit integer format. Alternatively, if the output device is considered high quality, then the decode format is determined to be a 8.24 fixed-point integer format. Later, the audio content that is in the 8.24 fixed-point integer format is dithered and quantized down to a 16-bit format and the 16-bit audio is transmitted to a DAC.

As another example, if the source audio content is encoded in the AAC format and the output device is considered low quality, then the decode format is determined to be a 16-bit integer format. Alternatively, if the output device is considered high quality, then the decode format is determined to be a 32-bit floating point number format.

In an embodiment, even if the audio processing device determines that the hardware format is high quality and that dithering to a 16-bit integer format is required, the audio processing device still decodes the source audio content to a 16-bit integer format without decoding the source audio content to a 8.24 fixed-point integer format. Thus, no dithering is necessary. This step may be warranted in the scenario where (1) there are no other audio streams that are to be mixed with the decoded source audio content and (2) certain operations are not performed on the decoded source audio content. Such operations may include applying volume, equalization, time-pitch adjustment, sample rate conversion, and dynamic range compression.

"Applying volume" refers to automatically (either in hardware or software) boosting or attenuating the audio samples. An example of applying volume is the "sound check" operation in iTunes™. If sound check is performed, then a music library is analyzed to determine a volume adjustment to apply to each music track so that each music track is played at the same perceived volume level. Then, for a particular song, if sound check is applied and data indicates that a certain amount of volume needs to be applied to the particular song in order to be perceived as loud as another song, then that amount of volume will be applied to the particular song.

Therefore, in this embodiment, at step 340, the audio processing device determines whether dithering is considered necessary (e.g., according to Table 100). If not, then the process proceeds to step 350. If so, then the process proceeds to step 360.

At step 350, the audio processing device decodes the source audio content to the determined decode format.

At step 360, the audio processing device determines whether one or more criteria are satisfied. The one or more criteria may comprise whether (a) the source audio content is uncompressed or losslessly compressed 16-bit audio content and (b) certain operations are not to be performed on the to-be-decoded source audio content. Such operations may include scaling, mixing, volume adjustment, equalization, and mixing other audio streams with the to-be-decoded source audio content.

If (a) and (b) are satisfied, then the process proceeds to step 370 where the source audio content is decoded directly to a 16-bit integer format without any dithering of the decoded source audio content. If at least one of the (1) and (2) is not satisfied, then the process proceeds to step 380.

At step 380, the source audio content is decoded to the determined decode format (e.g., one of 24-bit integer, 32-bit floating point number, or 8.24 fixed-point integer formats) and later "dithered down" to a 16-bit integer format. Step 380 may include additional operations (such as scaling, mixing, volume adjustment, equalization, etc.) that are performed on the decoded audio, i.e., prior to the dithering step.

Changing the Hardware Format

While audio content is being decoded, the destination of processed audio data may be changed. For example, while audio data produced by decoding particular audio content is streamed to built-in speakers of an audio processing device, a user of the device may plug a USB cord (connected to a USB audio device) into a USB port of the device. Prior to the USB cord being plugged in, the audio processing device may have made a determination to decode audio to a 16-bit integer format based on the fact that the built-in speakers are considered to be a low quality output device. However, the USB audio device may be considered to be a high quality output device.

In an embodiment, the decode format is changed "mid-stream." In other words, a portion of a particular audio source is decoded to, for example, a 16-bit integer format. Then, before the remainder of the particular audio source is decoded, the decoding process changes such that the remainder of the particular audio source is decoded to, for example, a 32-bit floating point number format. The decode format is changed mid-stream only if no synchronization issues will arise from the change. A synchronization issue may arise if another data source (whether audio or video) is being streamed or if a user interface is displaying the precise playback location in the audio stream. If so, then both data streams, for example, might no longer be synchronized with each other.

In another embodiment, the decode format is only changed if the audio stream (i.e., generated from the source audio content) is complete or when playback is stopped and restarted. Stopping and restarting playback of source audio content may occur when the user moves (via a user interface) the playback location to another position in the audio stream.

Hardware Overview

According to one embodiment, the techniques described herein are implemented by one or more special-purpose computing devices. The special-purpose computing devices may comprise a plurality of elements, including logic elements, that are hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
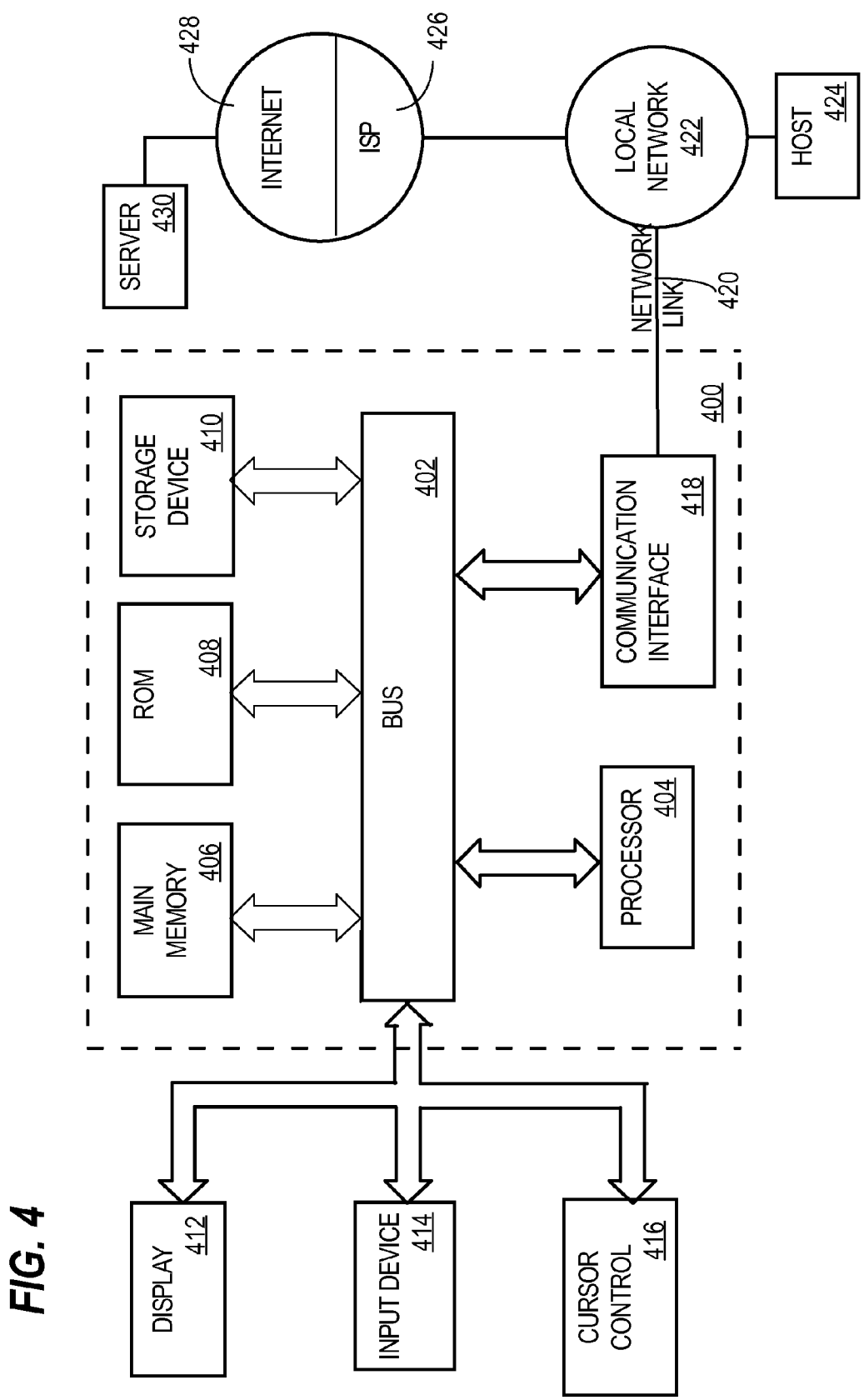
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An audio processing system comprising a plurality of elements that include logic elements, wherein the plurality of elements are configured to perform operations including:
   determining an encode format of audio content to be decoded by an audio processing device;
   determining a hardware format supported by an output device to which decoded audio data is to be provided, wherein the output device is coupled to the audio processing device, and wherein the output device has an associated audio fidelity;
   based upon the hardware format supported by the output device, the encode format of the audio content, and the fidelity of the output device, determining a decode format, from a plurality of decode formats, to which audio content is to be decoded, wherein the plurality of decode formats includes at least one decode format having a bit depth that is equal to the bit depth of the hardware format and at least one decode format having a bit depth that is higher than the bit depth of the hardware format;
   decoding at least a portion of the audio content to the determined decode format, wherein the bit depth of the determined decode format is determined at least in part by the fidelity associated with the output device; and
   converting at least a portion of the audio content from the decode format to the hardware format supported by the output device; and
   providing the audio content to the output device after the converting.

2. The system of claim 1, wherein the audio content has one of the following encode formats: 16-bit pulse-code modulation (PCM), 24-bit PCM, Advanced Audio Coding (AAC), MP3, Apple Lossless, Waveform Audio File Format (WAV), or Audio Interchange File Format (AIFF).

3. The system of claim 1, wherein decoding the audio content to the decode format comprises:
   generating, based at least in part upon the audio content, a first version of decoded audio that is at a first bit depth corresponding to the bit depth of the decode format; and
   generating, based at least in part upon the first version of decoded audio and a dithering processing, a second version of decoded audio that is at a second bit depth that is lower than the first bit depth, the second bit depth corresponding to the bit depth of the hardware format supported by the output device.

4. The system of claim 1, wherein the decode format is based on a 32-bit floating point number, 8.24 fixed-point integer, a 24-bit integer, or a 16-bit integer.

5. The system of claim 1, wherein the plurality of elements are configured to perform further operations including:
   determining whether at least one operation of one or more operations will be performed on the decoded audio prior to the decoded audio being converted from the decode format into the hardware format supported by the output device; and
   in response to determining that at least one of the one or more operations will be performed:
      generating the decoded audio at a first bit depth that is higher than the bit depth of the hardware format supported by the output device;
      performing the at least one operation on the decoded audio to generate second audio data; and
      generating, based at least in part upon the second audio data, third audio data that is at a second bit depth that is lower than the first bit depth, the second bit depth corresponding to the bit depth of the hardware format supported by the output device.

6. The system of claim 5, wherein the audio content is at a first bit depth, wherein decoding the audio content to the decode format further comprises:
   in response to determining that none of the one or more operations will be performed on the decoded audio prior to the decoded audio being converted into the hardware format supported by the output device, generating the decoded audio at the first bit depth without first generating a version of the decoded audio at a second bit depth that is higher than the first bit depth.

7. The system of claim 5, wherein the one or more operations include mixing the decoded audio with other audio data, applying volume to decoded audio, and equalization of the decoded audio.

8. The system of claim 1, wherein the decode format is a first decode format, the output device is a first output device having an associated first fidelity, and wherein the plurality of elements are configured to perform further operations including:
   while decoding at least a portion of the audio content to the first decode format for output to the first output device having the first fidelity:
      detecting the coupling of a second output device having a second fidelity while decoding the portion of the audio content to the first decode format;
      responsive to the coupling of the second output device, determining the hardware format supported by the second output device;
      determining a second decode format to which a second portion of the audio content is to be decoded, wherein the second decode format is different than the first decode format, wherein the second portion is different than the portion; and
      decoding the second portion of the audio content to the second decode format for output to the second output device having the second fidelity.

9. The system of claim 8, wherein decoding the second portion of the audio content to the second decode format comprises:
   determining whether any other data content is being decoded while the portion of the audio content is being decoded; and
   only decoding the second portion of the audio content to the second decode format if it is determined that no other data content is being decoded while the portion of the audio content is being decoded.

10. A non-transitory machine-readable medium storing instructions which, when executed by one or more processors, causes the one or more processes to perform operations including:
    determining an encode format of audio content to be decoded by an audio processing device;
    determining a hardware format associated with an output device to which decoded audio data is to be provided, wherein the output device is coupled to the audio processing device, and wherein the output device has an associated audio fidelity;

based at least in part upon the hardware format associated with the output device, the encode format of the audio content, and the fidelity of the output device, determining a decode format selected from a plurality of decode formats to which audio content is to be decoded, the decode formats including a high quality format having a first bit depth and a low quality format having a second bit depth, wherein the first bit depth is higher than the second bit depth;

decoding at least a portion of the audio content from an encode format to the determined decode format for audio processing before converting the portion of the audio content to the hardware format associated with the output device, wherein the bit depth of the decode format is determined at least in part by the fidelity associated with the output device; and providing the audio content to the output device after the converting.

11. The medium of claim 10, wherein the audio content has one of the following encode formats: 16-bit pulse-code modulation (PCM), 24-bit PCM, Advanced Audio Coding (AAC), MP3, Apple Lossless, Waveform Audio File Format (WAV), or Audio Interchange File Format (AIFF).

12. The medium of claim 10, wherein decoding the audio content to the decode format comprises:
generating, based at least in part upon the audio content, a first version of decoded audio that is at a first bit depth corresponding to the bit depth of the decode format; and
generating, based at least in part upon the first version of decoded audio and a dithering processing, a second version of decoded audio that is at a second bit depth that is lower than the first bit depth, the second bit depth corresponding to the bit depth of the hardware format supported by the output device.

13. The medium of claim 10, wherein the decode format is based on a 32-bit floating point number, 8.24 fixed-point integer, a 24-bit integer, or a 16-bit integer.

14. The medium of claim 10, wherein decoding the audio content to the decode format further comprises:
determining whether at least one operation of one or more operations will be performed on decoded audio resulting from the decoding prior to the decoded audio being converted the hardware format supported by the output device.

15. The medium of claim 14, wherein decoding the audio content to the decode format further comprises:
in response to determining that at least one of the one or more operations will be performed on the decoded audio prior to the decoded audio being converted into the hardware format supported by the output device:
generating the decoded audio at a first bit depth that is higher than the bit depth of the hardware format supported by the output device;
performing the at least one operation on the decoded audio to generate second audio data; and
generating, based at least in part upon the second audio data, third audio data that is at a second bit depth that is lower than the first bit depth, the second bit depth corresponding to the bit depth of the hardware format supported by the output device.

16. The medium of claim 14, wherein the audio content is at a first bit depth, wherein decoding the audio content to the decode format further comprises:
in response to determining that none of the one or more operations will be performed on the decoded audio prior to the decoded audio being converted into the hardware format supported by the output device, generating the decoded audio at the first bit depth without first generating a version of the decoded audio at a second bit depth that is higher than the first bit depth.

17. The medium of claim 14, wherein the one or more operations include mixing the decoded audio with other audio data, applying volume to decoded audio, and equalization of the decoded audio.

18. The medium of claim 10, wherein the decode format is a first decode format, and the output device is a first output device having an associated first fidelity, wherein the instructions, when executed by the one or more processors, cause further operations including:
while decoding at least a portion of the audio content to the first decode format for output to the first output device having the first fidelity:
detecting the coupling of a second output device having a second fidelity while decoding the portion of the audio content to the first decode format;
responsive to the coupling of the second output device, determining the hardware format supported by with the second output device;
determining a second decode format to which a second portion of the audio content is to be decoded, wherein the second decode format is different than the first decode format, wherein the second portion is different than the portion; and
decoding the second portion of the audio content to the second decode format for output to the second output device having the second fidelity.

19. The medium of claim 18, wherein decoding the second portion of the audio content to the second decode format comprises:
determining whether any other data content is being decoded while the portion of the audio content is being decoded; and
only decoding the second portion of the audio content to the second decode format if it is determined that no other data content is being decoded while the portion of the audio content is being decoded.

20. A method comprising:
determining an encode format of audio content to be decoded by the audio processing device;
determining, by an audio processing device, a hardware format associated with an output device to which decoded audio data is to be provided, wherein the output device is coupled to the audio processing device, and wherein the output device has an associated audio fidelity;
based at least in part upon the hardware format and fidelity of the output device, and the encode format of the audio content, determining a processing mode decode format, from a plurality of decode formats, to which audio content is to be decoded, wherein the processing mode decode format is at a higher bit depth than the hardware format associated with the output device; and
decoding at least a portion of the audio content to the processing mode decode format;
converting at least a portion of the audio content from the processing mode decode format to the hardware format supported by the output device; and
providing the audio content to the output device after the converting.

21. The method of claim 20, wherein the audio content has one of the following formats: 16-bit pulse-code modulation (PCM), 24-bit PCM, Advanced Audio Coding (AAC), MP3, Apple Lossless, Waveform Audio File Format (WAV), or Audio Interchange File Format (AIFF).

22. The method of claim 20, wherein the processing mode decode format is based on a 32-bit floating point number, 8.24 fixed-point integer, a 24-bit integer, or a 16-bit integer.

23. The method of claim 20, wherein decoding at least a portion of the audio content to the processing mode decode format comprises:
   generating first audio data in the processing mode decode format;
   performing one or more operations on the first audio data to generate second audio data in the processing mode decode format; and
   while converting the second audio data from the processing mode decode format to the hardware format supported by the output device, generating third audio data at a bit depth corresponding to the bit depth of the hardware format supported by the output device.

24. The method of claim 23, wherein the one or more operations include mixing the first audio data with other audio data, applying volume to the first audio data or other audio data, and equalizing the audio data.

25. The method of claim 23, wherein the processing mode decode format is a first decode format, the method further comprising:
   while decoding at least a portion of the audio data to the first decode format:
      determining a second decode format to which a second portion of the audio content is to be decoded, wherein the second decode format is different than the first decode format, wherein the second portion is different than the portion; and
      decoding the second portion of the audio data to the second decode format.

26. The method of claim 25, wherein decoding the second portion of the audio data to the second decode format comprises:
   determining whether any other audio data is being decoded while the portion of the audio data is being decoded; and
   only decoding the second portion of the audio data to the second decode format if it is determined that no other audio data is being decoded while the portion of the audio data is being decoded.

* * * * *